(12) United States Patent
Straub et al.

(10) Patent No.: US 8,032,749 B2
(45) Date of Patent: Oct. 4, 2011

(54) METHOD FOR REMOTELY CONTROLLING AND/OR REGULATING A SYSTEM

(75) Inventors: Florian Straub, Wangen (DE); Thomas von Hoff, Zürich (CH); Mario Crevatin, Winterthur (CH); Hans-Peter Züger, Hausen (CH); Bernhard Deck, Weilheim (DE)

(73) Assignee: ABB Research Ltd, Zurich (CH)

( * ) Notice: Subject to any disclaimer, the term of this patent is extended or adjusted under 35 U.S.C. 154(b) by 883 days.

(21) Appl. No.: 10/510,372

(22) PCT Filed: Apr. 4, 2003

(86) PCT No.: PCT/CH03/00224
§ 371 (c)(1), (2), (4) Date: Apr. 14, 2005

(87) PCT Pub. No.: WO03/085945
PCT Pub. Date: Oct. 16, 2003

(65) Prior Publication Data
US 2005/0221811 A1    Oct. 6, 2005

(30) Foreign Application Priority Data
Apr. 5, 2002  (EP) .................................. 02405270

(51) Int. Cl.
*H04L 29/06* (2006.01)
*G06F 21/00* (2006.01)
(52) U.S. Cl. .................................. 713/170; 713/181
(58) Field of Classification Search .............. 713/168, 713/169, 170; 380/255; 455/420, 466, 419
See application file for complete search history.

(56) References Cited

U.S. PATENT DOCUMENTS

| | | | | |
|---|---|---|---|---|
| 5,148,479 A | * | 9/1992 | Bird et al. ...................... | 713/155 |
| 5,191,610 A | * | 3/1993 | Hill et al. ....................... | 380/262 |
| 5,371,794 A | * | 12/1994 | Diffie et al. .................... | 713/156 |
| 5,940,002 A | * | 8/1999 | Finn et al. ..................... | 340/5.26 |
| 6,201,996 B1 | | 3/2001 | Crater et al. | |
| 6,275,710 B1 | * | 8/2001 | Oinonen et al. .............. | 455/466 |

(Continued)

FOREIGN PATENT DOCUMENTS
CN    1283827 A    2/2001
(Continued)

OTHER PUBLICATIONS
Translation of Office Action issued in Chinese Patent Application No. 03807678 issued Apr. 11, 2008.

(Continued)

*Primary Examiner* — Gilberto Barron, Jr.
*Assistant Examiner* — Izunna Okeke
(74) *Attorney, Agent, or Firm* — Buchanan Ingersoll & Rooney PC

(57) ABSTRACT

The invention relates to a method for remotely controlling and/or regulating at least one system (1), in particular an industrial system using a communications device (2) which is assigned to the system (1), and at least one receiver device (3), information relating to the system being transmitted from the communications device (2) to the at least one receiver device (3), the information containing a validation code which is generated by the communications device (2), a message being received by the communications device (2), the communications device (2) extracting a check code and instruction information from the message according to a first extraction rule, the communications device (2) validating the message by means of the validation code and check code, and the instruction information being implemented by the system (1) only when the validation is successful.

25 Claims, 1 Drawing Sheet

U.S. PATENT DOCUMENTS

| | | | |
|---|---|---|---|
| 6,295,458 B1 * | 9/2001 | Takahashi | 455/466 |
| 6,301,484 B1 * | 10/2001 | Rogers et al. | 455/466 |
| 6,393,297 B1 * | 5/2002 | Song | 455/466 |
| 6,606,709 B1 * | 8/2003 | Connery et al. | 726/14 |
| 6,956,461 B2 * | 10/2005 | Yoon et al. | 340/310.11 |
| 2002/0045442 A1 * | 4/2002 | Silen et al. | 455/420 |

FOREIGN PATENT DOCUMENTS

| | | |
|---|---|---|
| EP | 0 617 350 A1 | 9/1994 |
| EP | 0 930 792 A2 | 7/1999 |
| SU | 1117677 A | 10/1984 |
| WO | WO 88/06826 | 9/1988 |
| WO | 01/48722 A1 | 7/2001 |
| WO | 01/72012 A2 | 9/2001 |
| WO | WO 0172012 A2 * | 9/2001 |

OTHER PUBLICATIONS

Translation of pp. 8 and 9 of Appendix to Office Action issued in Chinese Patent Application No. 03807687.X issued Apr. 11, 2008.

German Translation of Office Action issued in Russian Patent Application No. 2004132704/09(035122).

* cited by examiner

METHOD FOR REMOTELY CONTROLLING AND/OR REGULATING A SYSTEM

TECHNICAL FIELD

The invention relates to the field of controlling and/or regulating remotely located systems. It relates to a method for remotely controlling and/or regulating a system, in particular an industrial system, in accordance with the preamble of the independent patent claim.

PRIOR ART

Possible ways of remotely monitoring, controlling and/or regulating are an increasingly important factor in the design in all types of systems, in particular in industrial systems and supply systems, for example in the areas of electricity, water and heat. Such possible ways permit increases in efficiency and flexibility when operating and maintaining the systems, in particular with respect to customer service performances and servicing performances, but also when complex systems are operated normally, if a frequent intervention of operator personnel for fault-free operation of the systems is required. One aspect of the remote monitoring and control relates here to the transmission of information relating to the system, for example in the form of a warning or of an alarm, and subsequent return transmission of instruction information as a reaction of the operator personnel.

EP 617350 discloses methods for remotely controlling heating or air-conditioning systems and for the performance of self-diagnostics with remote transmission of diagnostic results. During the self-diagnostics, data of the heating or air-conditioning system relating to the diagnostics are sensed, processed and encoded by a communications device and transmitted after a data link has been set up as diagnostic information to an external receiver device, at which they are received, decoded and ultimately processed, displayed, printed out and/or stored. During the remote control, a data link is firstly set up from an external instruction device to the communications device and instruction information is subsequently encoded in the instruction device, transmitted to the communications device, received there and decoded and ultimately processed and/or executed in the communications device and/or a controller and/or regulator of the heating or air-conditioning system. Diagnostic information and/or instruction information can be transmitted here via a direct line, but it is also possible to use existing conventional information transmission systems, for example telecommunications systems of the Deutsche Bundespost such as telephone, fax, Cityruf or the like for the transmission.

A problem with systems which can be remotely controlled and/or regulated is the risk of intervention in the system by unauthorized persons. If the communications device has a link to a public network, for example a telecommunications system of the Deutsche Bundespost, a link can be set up to the communications device by unauthorized persons without relatively great difficulties. If a protocol for encoding/decoding the instruction information is known, unauthorized persons can very easily transmit instruction information to the communications device. If this information is correspondingly executed by the controller and/or regulator, failures or even damage to the system may occur, and also, depending on the system, the surroundings and the environment may, under certain circumstances, also be put at risk or damaged. EP 617350 therefore proposes to carry out user authentication in the communications device before instruction information is actually input. For this purpose, a password or a code number containing the authorization for access to the communications device and thus to the system must be input.

While the risk of access by unauthorized persons can largely be prevented by user authentication, there is nevertheless a certain residual risk. This is in particular the case if the password or the code number is, or becomes known, to unauthorized persons.

One particular risk is also constituted by what are referred to as hacker attacks. These are attacks by unauthorized persons who aim to guess the password and/or code number through repeated attempts. In particular, systems of this kind whose communications devices have links to computer networks are particularly at risk here as the hacker attacks can be automated using computer programs and/or scripts so that a very large number of attempts at guessing a password and/or code number can be carried out within a short time.

DESCRIPTION OF THE INVENTION

For this reason, the object of the invention is to specify a method for remotely controlling and regulating systems which effectively minimizes the risk of manipulation by unauthorized persons and in particular protects against hacker attacks.

The object of the invention is also to specify a reliable method for remotely controlling and/or regulating a system which does not require a user authentication to take place before actual transmission of instruction information, so that said method is simple and efficient.

These objects are achieved by means of a method as claimed in claim 1. A communication which comprises information relating to the system and a validation code is dispatched, preferably to a receiver device which is determined in advance, by a communications device assigned to the system. As soon as the communications device receives a message at a time after the communication has been dispatched, a check code is extracted from this message according to a predefined rule. The origin of the message is checked by means of the validation code and check code taking into account the predefined rule, i.e. it is checked whether the message originates from a receiver of the communication. It is thus possible to use the validation code and check code to verify whether the received message constitutes a response to the dispatched communication.

Only in cases in which it has been successively checked that the message originates from a receiver of the communication is instruction information both extracted from the received message in addition to the check code according to the predefined rule and processed and/or executed by the system.

If, on the other hand, it was not possible to use the validation code and check code to verify that the received message constitutes a response to the dispatched communication, either the instruction information is not extracted at all from the message or the extracted instruction information is ignored.

This object and further objects, advantages and features of the invention become clear from the following detailed description of a preferred exemplary embodiment of the invention in conjunction with the drawings.

WAYS OF IMPLEMENTING THE INVENTION

Figure 1:
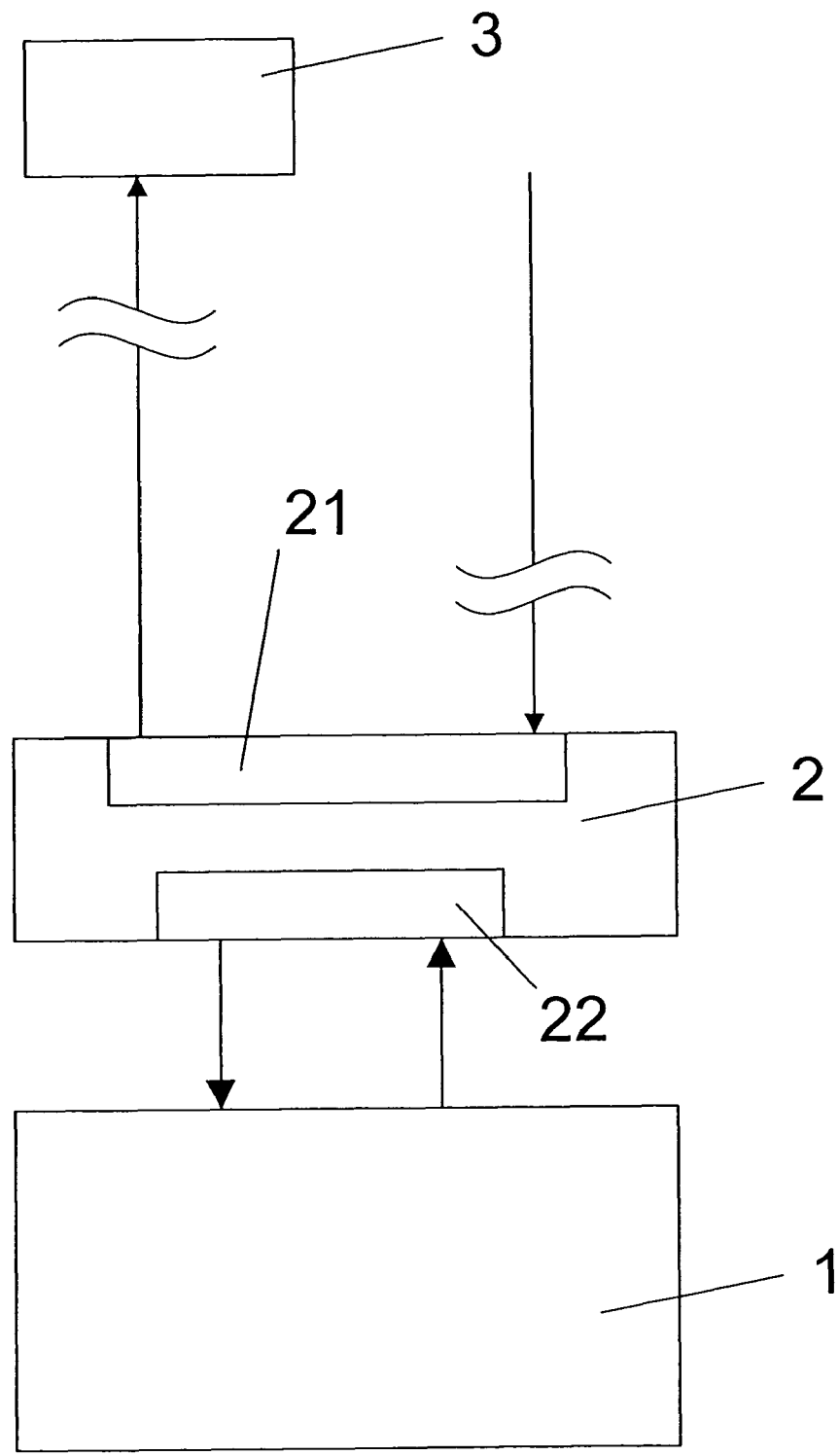
FIG. 1 is a schematic view of a block circuit diagram of a system which can be remotely controlled and/or regulated by means of the method according to the invention.

FIG. 1 is a schematic view of a block circuit diagram of a system 1 which can be remotely controlled and/or regulated in accordance with the inventive method by means of a communications device 2, which has a system interface 21 and a network interface 22, and a receiver device 3. The network interface 22 has in each case at least one means for transmitting and receiving communications and/or messages.

Data relating to the system is collected and, if appropriate, conditioned in the communications device 2, a connected data processing system and/or a subunit of the system 1. The data may relate directly or indirectly to the system 1. Said data may comprise, on the one hand, operating parameters such as, for example, temperatures, pressures, flow rates of substances, configuration parameters such as switch settings or valve settings and, on the other hand, also ambient parameters such as, for example, ambient temperatures or the like. Said data may be, as in the abovementioned examples, individual data items which can be expressed by a single numerical value, but may advantageously also comprise complex data records which are preprocessed by a subunit of the system. Finally, the data is combined to form an information item. Here, the information item may be composed of only a single data item, but it can also be composed of a multiplicity of data items or else be the result of an analysis of data which has been carried out in the communications device 2, the connected data processing system or the system 1 itself.

A communication which contains the information is transmitted to a receiver device 3 by the communications device 2 via the network interface 21 when certain conditions are fulfilled. A condition for the transmission of a communication is preferably an error in the system 1 which is diagnosed when the data is evaluated. However, it is also conceivable that a communication is transmitted independently of a state of the system 1, for example if a parameter which indirectly relates to the system 1, such as the ambient temperature, exceeds or drops below a certain limiting value. In the aforesaid situations, the transmission of the communication constitutes, as it were, an alarm. The communication can, however, also be advantageously transmitted at a fixed time, on a fixed day or on previously determined dates.

A validation code is added to the communication by the communications device 2. For this purpose, the information and validation code are combined in accordance with a first combination rule. This is advantageously carried out by appending information and validation code. If the information and validation code are composed of sequences of characters, predefined control or special characters are advantageously interposed as a separator during the appending process.

Preferably, the validation code is valid only once and has a limited period of validity. The validation code is generated in a suitable way, for example by means of a random number generator so that it cannot be predicted by unauthorized persons. The limited period of validity and the fact that the validation code is valid only once make the system 1 more difficult to manipulate by unauthorized persons in cases in which the validation code becomes known.

The method according to the invention is continued as soon as a message is received by the communications device 2 via the network interface 21. The communications device 2 then extracts a check code from the message according to a first extraction rule. The origin of the received message is then checked by means of the validation code and the check code. A check code which is identical to the validation code is advantageously used for this purpose. The checking of the origin is then carried out by comparing validation code and check code. To do this, when the communication is dispatched, a copy of the validation code must be stored so that it is available for the comparison when a message is received later. A limited period of validity of the validation code is advantageously made possible in this case by virtue of the fact that a validity information is stored together with the validation code. However, a checking procedure can also be advantageously be used without explicit knowledge of the validation code. Thus, inter alia, specific properties of the validation code can be used for checking, for example its checksum. The check code then only has to be checked for these properties, in the example the checksum.

In addition to the check code, instruction information is also extracted from the message in accordance with the first extraction rule. Only when there is successful checking by means of the validation code and check code is the instruction information passed on by the communications device 2 to the system 1 via the system interface 22 in order to be executed, if appropriate after previous processing. Here, a control device is preferably provided between the communications device 2 and system 1, the instruction information being transmitted to said control device and passed on from it to the system 1. If the checking was not successful, the instruction information is ignored.

The first extraction rule is preferably configured in such a way that the check code and instruction information is extracted by cutting out parts of the message.

As is apparent from the previous explanations, one application of the method according to the invention ensures that only a receiver of the communication, and thus of the validation code, is capable of issuing instructions for remotely controlling and/or regulating the system 1. In order to do this, the receiver must firstly extract the validation code from the communication in accordance with a second extraction rule which constitutes a reversal of the first combination rule. From the instructions which he intends to issue, he can generate a message together with the validation code given knowledge of the first extraction rule, from which the communications device 2 after having received said message, extracts a check code, which check code leads to successful checking of the message and thus to the extraction and implementation of the instruction information. To do this, he must use a second combination rule which ensures this.

In a further preferred embodiment of the method according to the invention, dispatcher information is extracted from the message in accordance with a third extraction rule. In the communications device 2, the dispatcher information is checked and the instruction information is passed on from the communications device 2 to the system 1 and/or processed only in the case of successful dispatcher identification, i.e. correspondence between the dispatcher information and stored dispatcher data of authorized users. The dispatcher information preferably contains a secret password or a secret code number. In this case, the operation is what is referred to as a strong user authentication, i.e. the dispatcher is authenticated as an authorized user by virtue of the fact that, on the one hand, he knows something—namely the password or code number—and, on the other hand, he possesses something—in the present case the receiver device 3 to which the communication was transmitted, or alternatively the communication which he has received with the receiver device 3.

Here, the receiver of the communication must add, in accordance with a third combination rule, the dispatcher information to a message which he generates.

In one preferred embodiment of the method according to the invention, the validation code, check code and/or dispatcher information are transmitted in encrypted form. To do this, the validation code and/or dispatcher information itself is preferably encrypted before it is added to the communication or message in accordance with a first or third combination rule. However, the entire communication and/or message can also advantageously be encrypted. If the communications device 2 receives an encrypted message, it must firstly be decrypted. If the check code or dispatcher information is present in an encrypted form after extraction from the message, it is to be decrypted. If the message contains dispatcher information, the risk of manipulation by unauthorized persons is reduced further by encrypted transmission because the dispatcher information cannot readily be acquired from illegitimately monitored or intercepted messages. Even if code is to be subject to having a limited period of validity, encrypted transmission is advantageous. In this case, validity information can be added directly to the validation code, for example by appending. Manipulation of the validity information by the receiver is ruled out. After decryption of the message or check code in the communications device 2, the validity information is available again in plain text. It is thus not necessary to store the validity information.

In one preferred embodiment of the method according to the invention, the communication or the message is transmitted or received by means of the short message service (SMS) over a GSM or ISDN network.

In a further preferred embodiment of the method according to the invention, the message is received via a public computer network, preferably the Internet.

The means such as communications device 2, network interface 21, system interface 22, receiver device 3 and control device which are used for carrying out the method according to the invention in accordance with the description above are to be understood as functional elements and do not necessarily need to be embodied as stand-alone physical units. Thus, the method can advantageously also be used to remotely control and/or regulate a system 1 in which the communications device and/or the control device is integrated into the system 1. The communications device 2 can advantageously be integrated into an electronic computing system in which the control device is advantageously also implemented. The electronic computing system is advantageously also used as a data processing system when data relating to the system is acquired and analysed.

The method according to the invention can advantageously also be used in the remote control and/or regulation of computer-based systems such as, for example, data processing systems, financial transaction systems or trading systems.

The receiver of the communication will generally be a person. The communication can in this case advantageously also be present in an audible form and comprise, for example, a chronological sequence of information and the validation code. However, it is also conceivable for the receiver to be an electronic device which automatically generates a message with suitable instruction information in response to the communication and transmits it back to the communications device 2.

LIST OF REFERENCE NUMERALS

| | |
|---|---|
| 1 | System |
| 2 | Communications device |
| 21 | Network interface |
| 22 | System interface |
| 3 | Receiver device |

The invention claimed is:

1. A method for remotely controlling and/or regulating at least one system, comprising:
   generating a validation code having a limited period of validity, the validation code being variably generated to be valid only once for a communication to be dispatched,
   adding validity information to the validation code, which validity information defines the limited period of validity of the validation code,
   combining information relating to the system and the validation code in accordance with a first combination rule,
   dispatching the communication by a communication device assigned to the system, the communication comprising the information relating to the system, the validation code, and the validity information, and
   receiving a message after the communication has been dispatched,
   processing the received message, the processing comprising;
      extracting a check code from the message according to a first extraction rule,
      checking whether the message originates from a receiver of the communication based on the validation code and the check code,
      verifying whether the message is received within the limited period of validity defined by the validity information, and
      if the checking and the verifying are successful, extracting instruction information according to the first extraction rule from the message and implementing the instruction information by the system.

2. The method as claimed in claim 1, wherein the adding of the validity information to the validation code comprises appending or prefixing the validity information to the validation code.

3. The method as claimed in claim 1, wherein the validation code is generated by a random number generator.

4. The method as claimed in claim 1, wherein
   the validity information is directly added to the validation code,
   in the dispatching, the validation code is transmitted in an encrypted form, and
   after a decryption of the message or check code in the communications device, making the validity information available in plain text, wherein the validity information is not stored in the communication device.

5. The method as claimed in claim 1, comprising encrypting the validation code before the combination in accordance with the first combination rule.

6. The method as claimed in claim 1,
comprising transmitting the check code in encrypted form.

7. The method as claimed in claim 1, comprising:
generating dispatcher information by the receiver of the communication,
adding, by the receiver of the communication, the dispatcher information to the message which the receiver generates,
extracting the dispatcher information from the received message in accordance with a third extraction rule,
identifying the dispatcher based on the dispatcher information and stored dispatcher data,
if the checking, verifying, and identifying are successful, implementing the instruction information by the system, after the check code and dispatcher information have been extracted from the message, and
if at least one of the checking, verifying, and identifying is not successful, ignoring the instruction information.

8. The method as claimed in claim 7, wherein
the dispatcher information contains a secret password or a secret identification number.

9. The method as claimed in claim 7,
comprising transmitting the dispatcher information in an encrypted form.

10. The method as claimed in claim 7,
comprising encrypting the dispatcher information before adding the dispatched information to the message in accordance with a third combination rule.

11. The method as claimed in claim 1, wherein
the communication and/or message are encrypted.

12. The method as claimed in claim 1, wherein
the communication and/or the message are dispatched and/or received by means of short message service.

13. The method as claimed in claim 1, wherein the message is received via the Internet.

14. The method as claimed in claim 1, comprising:
storing, when the communication is dispatched, a copy of the validation code so that the validation code is available for the checking when the message is received later, and
storing the validity information together with the validation code.

15. A method for remotely controlling and/or regulating at least one system, comprising:
generating a validation code having a limited period of validity, the validation code being variably generated to be valid only once for a communication to be dispatched,
adding validity information to the validation code, which validity information defines the limited period of validity of the validation code,
combining information relating to the system and the validation code in accordance with a first combination rule,
dispatching the communication by a communication device assigned to the system, the communication comprising the information relating to the system, the validation code, and the validity information, and
receiving a message after the communication has been dispatched,
processing the received message, the processing comprising;
extracting a check code from the message according to a first extraction rule,
checking whether the message originates from a receiver of the communication based on the validation code and the check code,
verifying whether the message is received within the limited period of validity defined by the validity information,
if the checking and the verifying are successful, extracting instruction information according to the first extraction rule from the message and implementing the instruction information by the system.

16. The method as claimed in claim 15, wherein
the adding of the validity information to the validation code comprises appending or prefixing the validity information to the validation code.

17. The method as claimed in claim 15, wherein
the validation code is generated by a random number generator.

18. The method as claimed in claim 15, comprising:
generating dispatcher information by the receiver of the communication,
adding, by the receiver of the communication, the dispatcher information to the message which the receiver generates,
extracting the dispatcher information from the received message in accordance with a third extraction rule,
identifying the dispatcher based on the dispatcher information and stored dispatcher data,
if the checking, verifying, and identifying are successful, implementing the instruction information by the system, after the check code and dispatcher information have been extracted from the message, and
if at least one of the checking, verifying, and identifying is not successful, ignoring the instruction information.

19. A method for remotely controlling and/or regulating at least one system, comprising:
generating a validation code having a limited period of validity, the validation code being variably generated to be valid only once for a communication to be dispatched,
adding validity information to the validation code, which validity information defines the limited period of validity of the validation code,
combining information relating to the system and the validation code in accordance with a first combination rule,
dispatching the communication by a communication device assigned to the system, the communication comprising the information relating to the system, the validation code, and the validity information, and
receiving a message after the communication has been dispatched,
processing the received message, the processing comprising;
extracting a check code from the message according to a first extraction rule,
checking whether the message originates from a receiver of the communication based on the validation code and the check code,
verifying whether the message is received within the limited period of validity defined by the validity information, and
if the checking and the verifying are successful, extracting instruction information according to the first extraction rule from the message and implementing the instruction information by the system, wherein
in the dispatching, the validation code is transmitted in encrypted form, and
after a decryption of the message or check code in the communications device, making the validity information available in plain text, wherein the validity information is not stored in the communication device.

20. The method as claimed in claim 19, wherein the adding of the validity information to the validation code comprises appending or prefixing the validity information to the validation code.

21. The method as claimed in claim 19, wherein the validation code is generated by a random number generator.

22. The method as claimed in claim 19, comprising:

generating dispatcher information by the receiver of the communication, adding, by the receiver of the communication, the dispatcher information to the message which the receiver generates, extracting the dispatcher information from the received message in accordance with a third extraction rule, identifying the dispatcher based on the dispatcher information and stored dispatcher data, if the checking, verifying, and identifying are successful, implementing the instruction information by the system, after the check code and dispatcher information have been extracted from the message, and if at least one of the checking, verifying, and identifying is not successful, ignoring the instruction information.

23. The method as claimed in claim 1, wherein the at least one system comprises an industrial system.

24. The method as claimed in claim 15, wherein the at least one system comprises an industrial system.

25. The method as claimed in claim 19, wherein the at least one system comprises an industrial system.

* * * * *